United States Patent

Roget et al.

(10) Patent No.: US 6,595,257 B2
(45) Date of Patent: Jul. 22, 2003

(54) CARCASS REINFORCEMENT FOR AIRCRAFT TIRES

(75) Inventors: Cyrille Roget, Clermont-Ferrand (FR); Fernando Suarez, Menetrol (FR)

(73) Assignee: Michelin Recherche et Technique S.A., Granges-Paccot Switzerland (CH)

( * ) Notice: Subject to any disclaimer, the term of this patent is extended or adjusted under 35 U.S.C. 154(b) by 0 days.

(21) Appl. No.: 10/090,252

(22) Filed: Mar. 4, 2002

(65) Prior Publication Data

US 2002/0195187 A1 Dec. 26, 2002

(30) Foreign Application Priority Data

Mar. 9, 2001 (FR) .............................. 01 03279

(51) Int. Cl.$^7$ .............................................. B60C 15/00
(52) U.S. Cl. ........................................ 152/550; 152/553
(58) Field of Search ............................... 152/550, 553, 152/552

(56) References Cited

U.S. PATENT DOCUMENTS

| 5,379,820 A | * | 1/1995 | Cesar et al. ............ 152/550 X |
| 5,427,167 A | * | 6/1995 | Watanabe et al. ....... 152/553 X |
| 5,476,129 A | * | 12/1995 | Shoyama ................ 152/553 X |
| 5,522,443 A | * | 6/1996 | Ueyoko et al. ......... 152/553 X |
| 5,743,976 A | * | 4/1998 | Pena et al. ............. 152/552 X |
| 5,769,982 A | * | 6/1998 | De Loze de Plaisanc ... 152/553 X |
| 2002/0005239 A1 | * | 1/2002 | Royer et al. |
| 2002/0053387 A1 | * | 5/2002 | Ikuno |
| 2003/0041943 A1 | * | 3/2003 | Ueyoko |

* cited by examiner

Primary Examiner—Adrienne C. Johnstone
(74) Attorney, Agent, or Firm—Baker Botts L.L.P.

(57) ABSTRACT

An aircraft tire, inflated to a high pressure, comprising a tread connected to two beads 2 by way of two sidewalls 6, each bead having at least one annular reinforcing element 3, a crown reinforcement and a radial carcass reinforcement 1 comprising a number of axially inner plies 1A to 1D greater than or equal to two, which radial carcass reinforcement plies have textile reinforcing elements. Among the axially inner plies 1A to 1D, at least half the total number of axially inner plies 1C, 1D are turned up in each bead about at least one annular reinforcing element 3, at least one and at most three of the remaining axially inner plies 1A, 1B being not turned up in any of the beads and having ends situated radially below a straight line XX' parallel to the axis of rotation of the tire and passing through the radially innermost point of the cross-section of the annular reinforcing element 3 and axially inside a straight line YY', perpendicular to the axis of rotation and passing through the center of gravity O of the cross section of the annular reinforcing element 3.

4 Claims, 1 Drawing Sheet

CARCASS REINFORCEMENT FOR AIRCRAFT TIRES

BACKGROUND OF INVENTION

1. Technical Field of the Invention

The present invention relates to a tire with radial carcass reinforcement intended to bear heavy loads and inflated to relatively high pressures, and in particular a tire for aircraft.

2. The Related Art

The radial carcass reinforcements of such tires generally have several plies of textile reinforcing elements, which are anchored in each bead to at least one annular reinforcing element and in most cases to a single bead wire. The reinforcing elements of the carcass reinforcements are wound around the bead wire from the inside to the outside, forming upturns with respective ends spaced radially from the axis of rotation of the tire. The severe conditions under which tires for aircraft are used are such that the fatigue strength of the beads is low, particularly at the upturns of the carcass reinforcement.

A significant improvement in performance is obtained by separating the carcass reinforcement plies into two groups. The first group comprises the axially inner carcass reinforcement plies in the zone of the sidewalls and beads, such plies then being wound around an anchoring bead wire in each bead from the inside to the outside of the tire. The second group consists of at least one axially outer ply in the above zone, which ply is generally wound partially around the bead wire from the outside to the inside of the tire. Such arrangements are known and shown, for example, in U.S. Pat. No. 4,244,414 (FIG. 2).

French patent No. 2,671,517 proposes a solution which is complementary to the above and consists in arranging the edge(s) of the axially outer ply (plies) between the upturns of the axially inner plies.

The fatigue strength of the beads of tires for aircraft must, however, be improved, in particular when these beads are subjected to high overloads which may lead to deformations in height of the order of 50% or more. The large number of carcass plies, generally formed from reinforcing elements made of aliphatic polyamide, which number is necessary to bear the tension due to the test pressure which, as known, must be equal to four times the service pressure, obviously results in the multiplication of the number of free ends of reinforcing elements, the multiplication of the interfaces between plies, greater hysteresis losses and thus higher operating temperatures, all factors which are liable to increase the fatigue of the beads and limit their fatigue strength.

The solution proposed by the present invention to improve the fatigue strength of the beads of an aircraft tire is to reduce the number of carcass plies turned up about the anchoring bead wire in each bead.

SUMMARY OF THE INVENTION

According to the invention, an aircraft tire, inflated to a high pressure and comprising a tread connected to two beads by way of two sidewalls, each bead having at least one annular reinforcing element, includes a crown reinforcement and a radial carcass reinforcement comprising a number of axially inner plies greater than or equal to two, which radial carcass reinforcement plies have textile reinforcing elements. The tire is characterized in that, among the axially inner plies, at least half the total number of axially inner plies are turned up in each bead about at least one bead wire, at least one and at most three of the other axially inner plies being not turned up in any of the beads and having ends situated radially below a straight line XX', parallel to the axis of rotation of the tire and passing through the radially innermost point of the cross-section of the bead wire, and axially inside a straight line YY', perpendicular to the axis of rotation and passing through the center of gravity O of the cross-section of the bead wire.

A ply is referred to as not turned up about any annular reinforcing element when the same ply extends from one bead to the other and is not turned up at either of its ends. This arrangement distinguishes the present invention from the teaching of the British patent No. 875,771 in which some of the carcass plies are not turned up at one end but are turned up at their other end.

While providing the number of plies necessary and sufficient to withstand the tensions due to the internal inflation pressures imposed on the tire, the above arrangement furthermore permits a substantial reduction of the number of reinforcing layers under the annular reinforcing elements serving to anchor the carcass reinforcement. This leads to a reduction of the inside diameter of the annular reinforcing elements and, hence, a better positioning of the reinforcing elements, with, consequently, a better distribution of the contact pressures between the seats and flanges of the beads of the tire and the rim seats and flanges, and more uniform clamping on the rim, the net effect being an improved fatigue strength of the beads.

It has been found that, to improve the behavior in the water bursting test, it is advantageous for the axially inner plies which are not turned up to be chosen from the axially innermost plies, that is to say, the plies innermost in the tire.

The carcass reinforcement is advantageously completed by axially outer carcass plies, i.e., plies radially superposed on the axially inner plies in the region of the crown reinforcement of the tire, then extending in the sidewalls axially outside the inner carcass plies and in the zone of the beads along the upturns of the inner plies while being adjacent to them. The outer plies, also formed from textile reinforcing elements, are wound partially around the annular reinforcing element and have ends situated below a straight line XX', parallel to the axis of rotation of the tire and passing through the radially innermost point of the cross-section of the annular reinforcing element, and axially beyond the ends of the axially inner plies which are not turned up. The number of outer plies provided is preferably equal to the number of axially inner plies that are not turned up.

BRIEF DESCRIPTION OF THE DRAWING

The characteristics and other advantages of the invention will be better understood with the aid of the description of an illustrative example as shown in FIG. 1 of the drawing, which shows schematically, viewed in meridian section, a tire according to the invention.

DETAILED DESCRIPTION OF ILLUSTRATIVE EMBODIMENT

Figure 1:
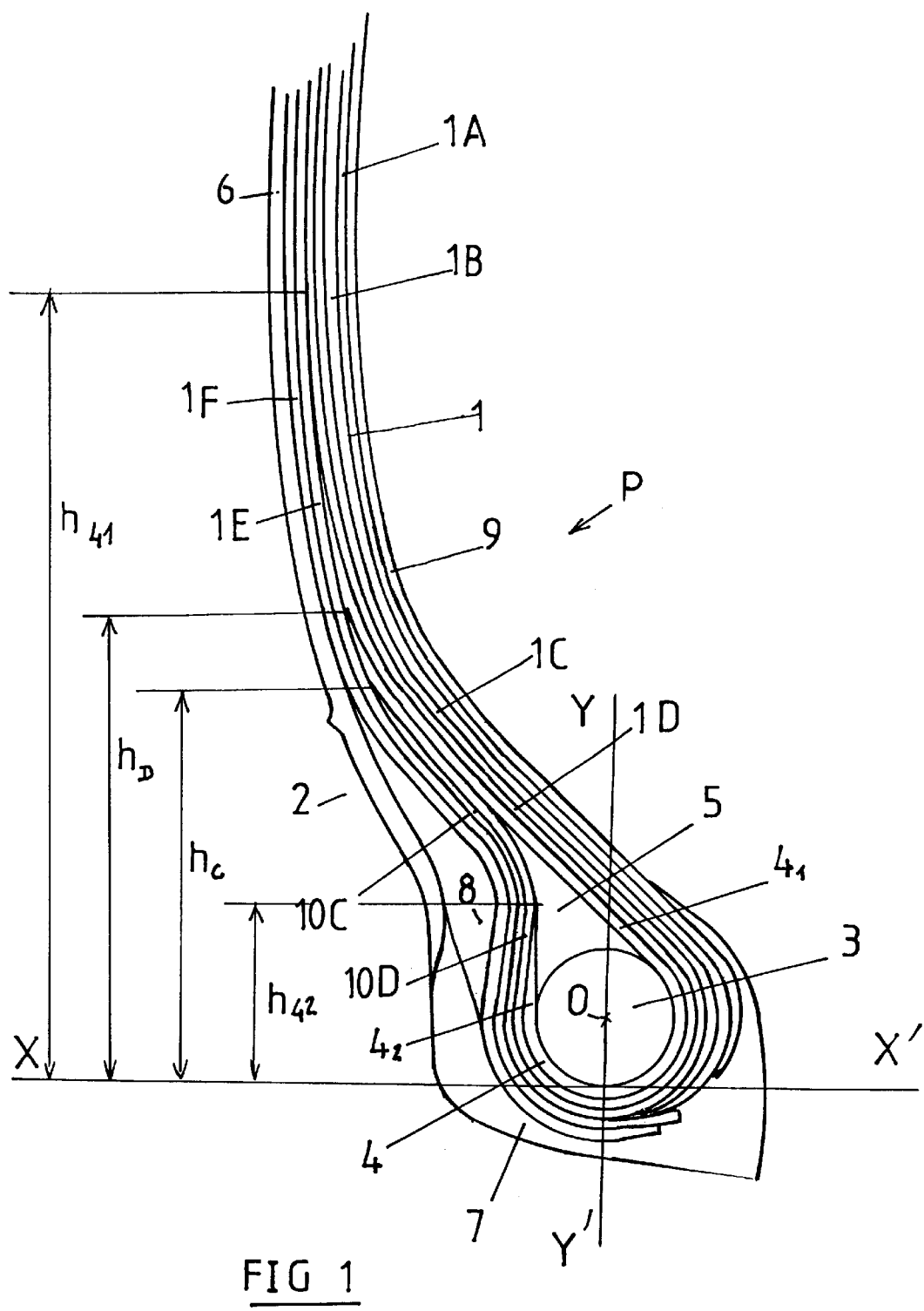

The example given is that of a tire of standard size 46×17.0 R 20 (standards of the Tire and Rim Association). The carcass reinforcement 1 is formed from six plies 1A to 1F of radial textile cords made of aliphatic polyamide (in particular of 188/3 or 210/3 nylon cords). Radial cords of an aircraft tire are to be understood as meaning cords forming angles which may be in the range 90°±15° with the circumferential direction. Among the six plies, the four plies 1A to 1D are referred to as axially inner plies, in the sidewalls and beads. Two (IC and ID) of the four plies are wound in each bead 2 around an annular reinforcing element in the form of a bead wire 3, having a circular cross-section in the embodiment shown, from the inside to the outside of the tire P, to form upturns 10C and 10D.

The ends of the upturns 10C and 10D are at respective heights hC and hD from the base of the bead, represented by a line XX' parallel to the axis of rotation of the tire and passing through the radially innermost point of the cross-section of the bead wire 3. The greatest height hC is the height of the upturn 10C of the third axially inner ply 1C, while the smallest height hD is the height of the upturn 10D of the fourth axially inner ply 1D. The two heights hC and hD are respectively equal to 26.7% and 22.8% of the height H of the tire as mounted and inflated on the rim (not shown). By definition, the height of the mounted and inflated tire is, viewed in meridian section, the radial distance measured between the point of the tread farthest from the axis of rotation and a line parallel to said axis at a distance from said axis equal to the standard nominal radius of the operating rim.

Arranged axially between the upturns 10C and 10D and the main parts of the inner carcass plies 1C and 1D are, on the one hand, radially above the bead wire, a substantially triangular rubber profile 5 and, on the other hand, the respectively inner and outer strands 41 and 42 of an inner reinforcing ply or flipper 4. The flipper 4 surrounds the rubber profile(s) 5 axially separating the main part of the carcass reinforcement (plies 1A to 1D) from the upturns 10C and 10D. The flipper 4 is formed from textile cords made of aliphatic polyamide, more particularly from 188/3 nylon cords, such cords being oriented at an angle equal to 88° relative to the circumferential direction. The two strands of the flipper 4 have heights h41 and h42, measured relative to the straight line XX', equal to 149 and 41 mm respectively.

The axially innermost plies 1A and 1B, continuous from bead to bead, are not turned up about the bead wire 3. Their ends, offset relative to each other, are situated radially below the straight line XX' and axially inside the straight line YY' perpendicular to the axis of rotation and passing through the center of gravity O of the meridian section of the bead wire 3.

The axially outer carcass reinforcement plies 1E and 1F have their edges covering the upturns 10C and 10D of the plies 1C and 1D of the carcass reinforcement 1 axially on the outside and adjacently. The axially outer carcass reinforcement plies 1E and 1F are wound around the anchoring bead wire 3 over a portion or circular arc corresponding to an angle at the center of the circle circumscribing the bead wire of no more than 180°, so that the ends of said plies 1E and 1F are situated radially below the straight line XX' parallel to the axis of rotation and axially inside the straight line YY'.

The axially outer carcass reinforcement plies 1E and 1F have a reinforcement density which is preferably lower (in the present example: 75 reinforcing elements per decimeter) than the reinforcement density of the axially inner carcass reinforcement plies 1A to 1D (here 83 reinforcing elements per decimeter) so as to further improve the fatigue strength of the plies subjected to repeated bending cycles. The reinforcement densities are measured in the circumferential direction axially at the center of gravity O of the bead wire. A preferred variant consists in the axially inner plies which are not turned up having a reinforcement density lower than the reinforcement density of the axially inner plies which are turned up about the bead wires.

It is also preferable for the modulus of elasticity under low deformation of the rubber mixes of the axially outer plies 1E and 1F to be lower than the same modulus of the axially inner plies 1A to 1D.

The radial carcass reinforcement 1 is radially surmounted by a crown reinforcement (not shown) comprising a working reinforcement and, radially on the outside, a protective reinforcement. The working reinforcement is, as known per se, obtained by winding, in a zigzag over a more or less cylindrical shape and from one edge of the reinforcement to the other, a band of eight cords made of aliphatic polyamide of the same kind and structure as the cords used in the carcass plies and flippers. The winding is continued until the required number of crossed layers is obtained. The protective crown reinforcement is composed of one ply, which ply is formed from metal cords which undulate in the plane of the ply and the mean direction of which forms a zero angle with the circumferential direction.

A tread, sidewalls 6, outer protective layers of the beads 7, a bead-filling profile 8, as well as an inner rubber layer 9 complete, as known, the composition of the illustrative tire.

A tire as described above was tested in accordance with the AIRBUS specification for the size referred to and successfully passed the prescribed test. Compared to a tire of the same size and having a carcass reinforcement in which the four axially inner plies were turned up about the anchoring bead wire, a weight reduction of 3.5% is obtained, the production time has been reduced, while this production is easier, and this is reflected in the industrial costs.

What is claimed is:

1. An aircraft tire, to be inflated to a high pressure, comprising a tread connected to two beads by way of two sidewalls, each bead having at least one annular reinforcing element, a crown reinforcement, and a radial carcass reinforcement comprising a number of axially inner plies greater than or equal to two, said radial carcass reinforcement plies having textile reinforcing elements, at least half the total number of axially inner plies being turned up in each bead about at least one annular reinforcing element, at least one and at most three of the remaining axially inner plies being not turned up in any of the beads and having ends situated radially below a straight line XX' parallel to the axis of rotation of the tire and passing through the radially innermost point of the cross-section of the annular reinforcing element and axially inside a straight line YY', perpendicular to the axis of rotation and passing through the center of gravity O of the cross-section of the annular reinforcing element.

2. The aircraft tire according to claim 1, wherein the axially inner plies which are not turned up are the axially innermost plies of the tire.

3. The aircraft tire according to claim 2, wherein the carcass reinforcement is completed by at least one axially outer ply formed from textile reinforcing elements, said at least one axially outer ply extending in the sidewalls axially outside the inner carcass plies and in the zone of the beads along the upturns of the turned-up inner plies while being adjacent to them.

4. The aircraft tire according to claim 3, wherein the number of the axially outer plies is equal to the number of axially inner plies which are not turned up.

* * * * *